United States Patent [19]
Crochet et al.

[11] Patent Number: 5,673,897
[45] Date of Patent: Oct. 7, 1997

[54] VALVE/ACTUATOR COMBINATION

[75] Inventors: Kevin W. Crochet, Metairie; Edward A. Sentilles, III, Lacombe, both of La.

[73] Assignee: Provacon, Inc., Reserve, La.

[21] Appl. No.: 402,915

[22] Filed: Mar. 13, 1995

[51] Int. Cl.$^6$ .................... F16K 31/122; F16K 27/12
[52] U.S. Cl. .................. 251/63.6; 92/62; 92/65; 105/377.07; 137/244; 137/382; 137/614.11; 141/348; 251/144; 251/214; 251/332; 251/333; 251/335.3
[58] Field of Search ............ 251/62, 63.5, 63.6, 251/335.3, 144, 214, 332, 333; 92/151, 62, 65; 137/242, 244, 382; 105/377.07; 141/347, 348

[56] References Cited

U.S. PATENT DOCUMENTS

| | | | |
|---|---|---|---|
| 1,426,008 | 8/1922 | Posson | 251/144 |
| 1,437,576 | 12/1922 | Webber | 251/144 |
| 1,474,297 | 11/1923 | Simpson | 251/144 |
| 2,710,121 | 6/1955 | Rees | 137/244 |
| 2,841,167 | 7/1958 | Jacobson | 137/327 |
| 2,901,888 | 9/1959 | Swift | 92/151 |
| 2,903,564 | 9/1959 | Carr | 251/368 |
| 3,152,607 | 10/1964 | Lundean | 137/614.11 |
| 3,219,311 | 11/1965 | Siver | 251/214 |
| 3,255,675 | 6/1966 | Reeve et al. | 92/151 |
| 3,388,719 | 6/1968 | Maginnis | 251/144 |
| 3,392,956 | 7/1968 | DeFrees | 251/144 |
| 3,457,840 | 7/1969 | Grimes | 92/151 |
| 3,554,088 | 1/1971 | Bruyn | 92/151 |
| 3,752,040 | 8/1973 | Pawloski et al. | 92/151 |
| 3,949,963 | 4/1976 | Aoki | 251/63.6 |
| 3,958,592 | 5/1976 | Wells et al. | 251/63.6 |
| 3,979,105 | 9/1976 | Pool et al. | 251/333 |
| 4,061,157 | 12/1977 | Hanssen | 251/214 |
| 4,306,583 | 12/1981 | Tucoulat | 251/335.3 |
| 4,356,838 | 11/1982 | Morello | 137/244 |
| 4,420,011 | 12/1983 | Roger | 137/269 |
| 4,541,607 | 9/1985 | Hotger | 251/63.4 |
| 4,568,058 | 2/1986 | Shelton | 251/62 |
| 4,585,207 | 4/1986 | Shelton | 251/62 |
| 4,621,656 | 11/1986 | Ichimaru | 137/242 |
| 4,765,586 | 8/1988 | Yoshida | 251/333 |
| 4,776,562 | 10/1988 | Kalaskie | 251/63.4 |
| 4,840,347 | 6/1989 | Ariizumi et al. | 251/63.4 |
| 4,903,939 | 2/1990 | Ariizumi et al. | 251/63.4 |
| 4,934,652 | 6/1990 | Golden | 251/63.6 |
| 5,129,625 | 7/1992 | Wood et al. | 251/214 |
| 5,346,172 | 9/1994 | Gonsior | 251/335.3 |

FOREIGN PATENT DOCUMENTS

| 2004212 | 8/1971 | Germany | 92/151 |
|---|---|---|---|

*Primary Examiner*—George L. Walton
*Attorney, Agent, or Firm*—Roy, Kiesel & Tucker

[57] ABSTRACT

A valve/actuator combination to operate off of low pneumatic pressures for use on tanker railcars including a valve having a valve body with a tank end, a valve seat near the tank end of the valve body, the valve seat having a valve sealing surface; a stem chamber extending through the valve body, the stem chamber having an actuator port, a seat port, and an outlet port; a valve stem slidably positioned in the stem chamber, the valve stem having a plug end and a plug attached to the plug end, the plug having a plug sealing surface to sealingly contact the valve sealing surface; an actuator having a hollow housing with a valve end, the valve end attached to the valve body; a plurality of piston assemblies, each having a piston slidable in the housing and a partition fixed in the housing, the piston and the partition defining an actuator chamber; piston spacers joining the pistons so that each piston is fixed in position with respect to the others; the pistons being operatively joined to the valve stem; a helical coil for generating a biasing force to bias the plug sealing surface against the valve seat sealing surface thereby closing the valve; and a passage for introducing pressurized fluid into the actuator chambers so that the pressurized fluid exerts a force against the pistons sufficient to overcome the biasing force to open the valve.

10 Claims, 4 Drawing Sheets

1

VALVE/ACTUATOR COMBINATION

DESCRIPTION

1. Technical Field

This invention relates to a valve/actuator combination, and more particularly, to pneumatically operated piston actuators and globe valves in combination for use in tanker railway cars transporting hazardous materials where available pneumatic pressures are as low as 60 psig.

2. Background Art

Valves and actuators for tanker railway cars are subject to severe limitations due to standards imposed by various governing bodies, such as The Chlorine Institute and the American Association of Railroads. For instance, a valve/actuator combination must be attachable to the industry standard manway cover which covers the openings in the tanker railcar. The standard manway cover provides for the attachment of four valves—two for liquids and two for gasses. Further, all four valves must fit within the confines of the dome covering the manway cover. A more restrictive requirement is that each individual valve/actuator combination must be sized to fit within the confines of an industry standard emergency hood, generally a cylindrical space of height 13.5 inches with radius of 3 inches. The emergency hood is a device for sealing one of the four valve/actuator combinations attached to the manway cover. In this fashion, a leaking valve can be isolated without removing the tanker railway car from service and without the need to remove the defective valve until the car is scheduled for maintenance. Another restriction is that access to the valves is provided by standard sized openings in the tanker dome. If the valve/actuator cannot be accessed through the standard opening, it would be necessary to remove the railcar dome for access.

A restriction pertinent for the use of pneumatically operated actuators is that the generally available house pressures in the railway industry can be as low as 60 psig. For many types of materials transported by tanker railcars, these pressures, with the currently used single piston actuators, are insufficient. When transporting hazardous or toxic materials, such as chlorine, it is desirable to have the biasing force (which maintains the valve in the normally closed position) as great as possible. In general, the greater the biasing force closing and maintaining the valve in the closed position, the safer the seal. However, because of the limited confines within which the valve/actuator must reside, and because of the low house pressures, prior art piston operated actuators are limited in the mount of biasing force which can be overcome by a single piston actuator.

SUMMARY OF THE INVENTION

The invention disclosed is a globe valve/actuator combination. Because the combination disclosed provides redundant sealing means, the invention is particularly suited for use with caustic, corrosive or other environmentally hazardous substances. In particular, the invention can be use in conjunction with a tanker railcar to reduce the potential for leakage while loading or unloading hazardous substances, for instance chlorine. However, features of the invention are useful in other applications.

The invention incorporates a plurality of stacked pistons in the actuator. By stacking additional pistons within the actuator, the effect of low pneumatic house pressures can be overcome, allowing one to incorporate larger springs to produce greater biasing forces and to maintain a valve/actuator combination sized to accommodate the space constraints imposed by tanker railcar use. In fact, by adding stacked pistons in the actuator, additional sealing means can be incorporated in the valve/actuator combination making for a safer pneumatically operated valve. Such additional sealing means include incorporation of a bellows-type seal around the valve stem and inclusion of packing devices around the valve stem. Prior to the use of stacked pistons, these additional sealing devices could not be utilized in low pressure pneumatically operated valves/actuators due to the additional forces that resulted from their incorporation. Finally, larger springs can be incorporated in the valve/actuator combination to produce greater closing force on the sealing surfaces of the valve, enhancing safety and allowing the sealing surfaces to be self-cleaning.

OBJECTS OF THE INVENTION

Accordingly, it is an object of the present invention to provide for a valve/actuator combination using a plurality of stacked pistons.

It is another object of the invention to provide for a pneumatically driven valve/actuator combination for use with normally available house pressures.

It is another object of the invention to provide for a pneumatically driven valve/actuator combination for use on tanker railcars.

It is another object of the invention to provide for a pneumatically driven valve/actuator combination for use on tanker railcars transporting toxic or hazardous materials.

It is another object of the invention to provide for a valve and actuator with self-cleaning valve sealing surfaces.

It is another object of the invention to provide for a valve/actuator incorporating a multitude of sealing devices.

It is another object of the invention to provide for a valve and actuator having a bellows seal.

It is another object of the invention to provide for a valve and actuator using a series of Chevron-style washers for packing.

It is another object of the invention to provide for easy access to a valve and actuator attached to a tanker railcar during loading or unloading.

DETAILED DESCRIPTION OF THE INVENTION

Figure 1:
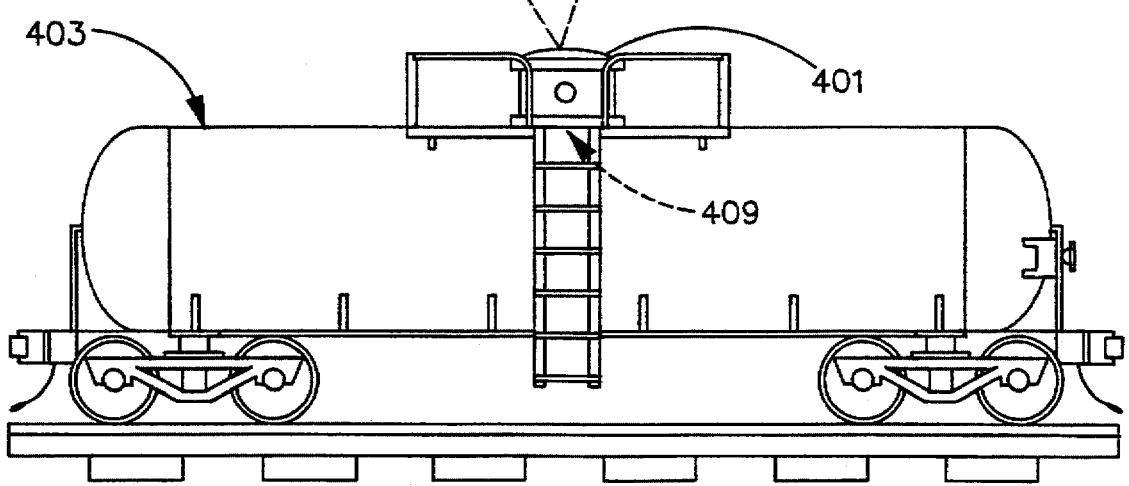
FIG. 1 is an elevation view of a tanker railcar with dome attached.

Turning to the drawings, FIG. 1 shows a tanker railcar 403. Standard tanker railcars 403 have an opening 409 in the top of the tanker to access the interior of the car. FIG. 1 also shows railcar dome 401 attached to tanker railcar 403. Railcar dome 401 covers and protects equipment, such as valves, placed therein.

Figure 2:
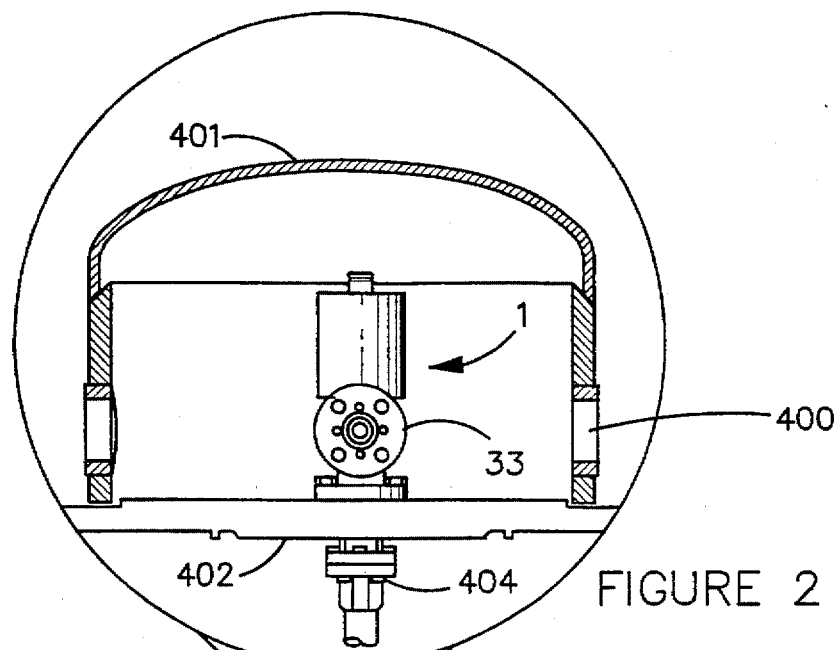
FIG. 2 is a cross-sectional view of a tanker railcar dome of a railcar such as that shown in FIG. 1.

FIG. 2 shows a sectional view of an attached railcar dome 401. Shown are dome port openings 400 through the railcar dome 401. Dome port openings 400 allow restricted access to the valves 1,407 positioned inside the railcar dome 401 without removal of the railcar dome 401. Both the railcar dome 401 and dome port openings 400 are normally standard sizes as specified by the American Association of Railroads ("AAR"). Also shown is an attached valve/actuator combination 1 mounted on a manway cover 402, and an end view of the outlet port extension 33. Outlet port extension 33 is more fully shown in FIGS. 6 and 7. Manway cover 402 is a standard cover for the opening 409 in the top of the tanker railcar 403. Finally, FIG. 2 shows an industry standard check valve 404 mounted on the manway cover 402 and extending downwardly into the interior of the tanker railcar 403. Check valve 404 would remain in place in the event of an accident where railcar 403 derails and rolls, shearing off the railcar dome 401 and the valves inside the railcar dome 401.

Figure 3:
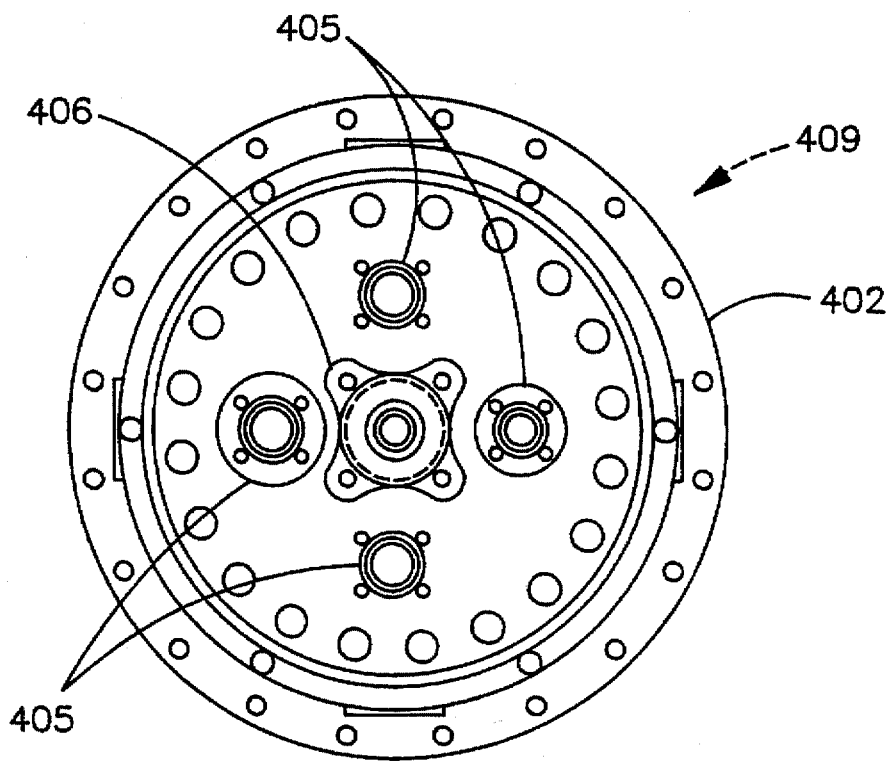
FIG. 3 is a top view of a manway cover of a railcar, such as that shown in FIGS. 1 and 2.

FIG. 3 is a top view of a manway cover 402. Manway cover 402 has four attachment ports 405 to any one of which a valve/actuator combination 1 can be attached. Also shown is a safety release valve port 406 for attachment of a safety release valve 407.

Figure 4:
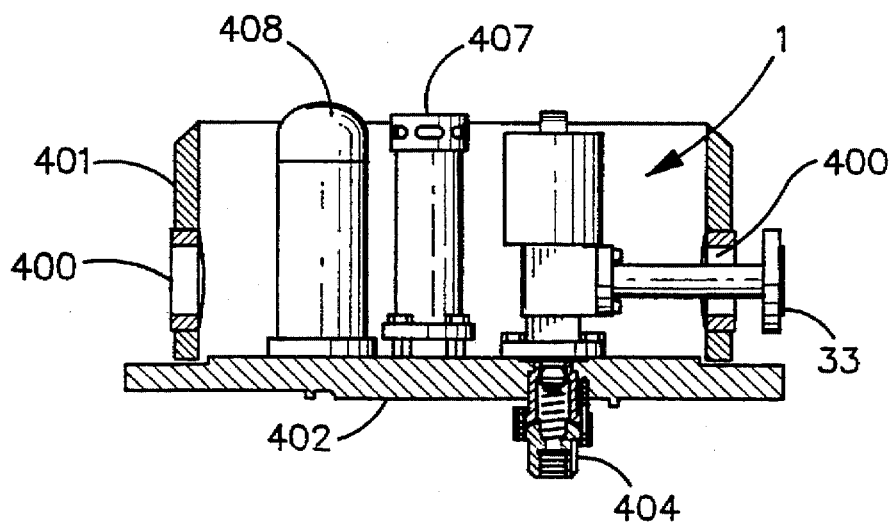
FIG. 4 is a partial cross-sectional view of a tanker railcar dome at a 90 degree angle from that shown in FIG. 2.

FIG. 4 shows is a partial cross-section through an attached railcar dome 401 showing the manway cover 402, a cross-section through a valve/actuator combination 1, a bleeder valve 407 and an emergency hood 408. Emergency hood 408 is of standard size as specified by The Chlorine Institute for Emergency Kit "C", 6A Hood. Emergency hood 408 is designed to be installed over and seal and isolate a leaking valve/actuator combination 1. The emergency hood 408 thus allows a leak to be isolated and the tanker railcar to remain in service. Thus, it is preferable for a new design for a valve/actuator combination 1 be able to attach to the standard AAR manway cover 402 and further, be sized to fit beneath a standard emergency hood 408.

Figure 5:
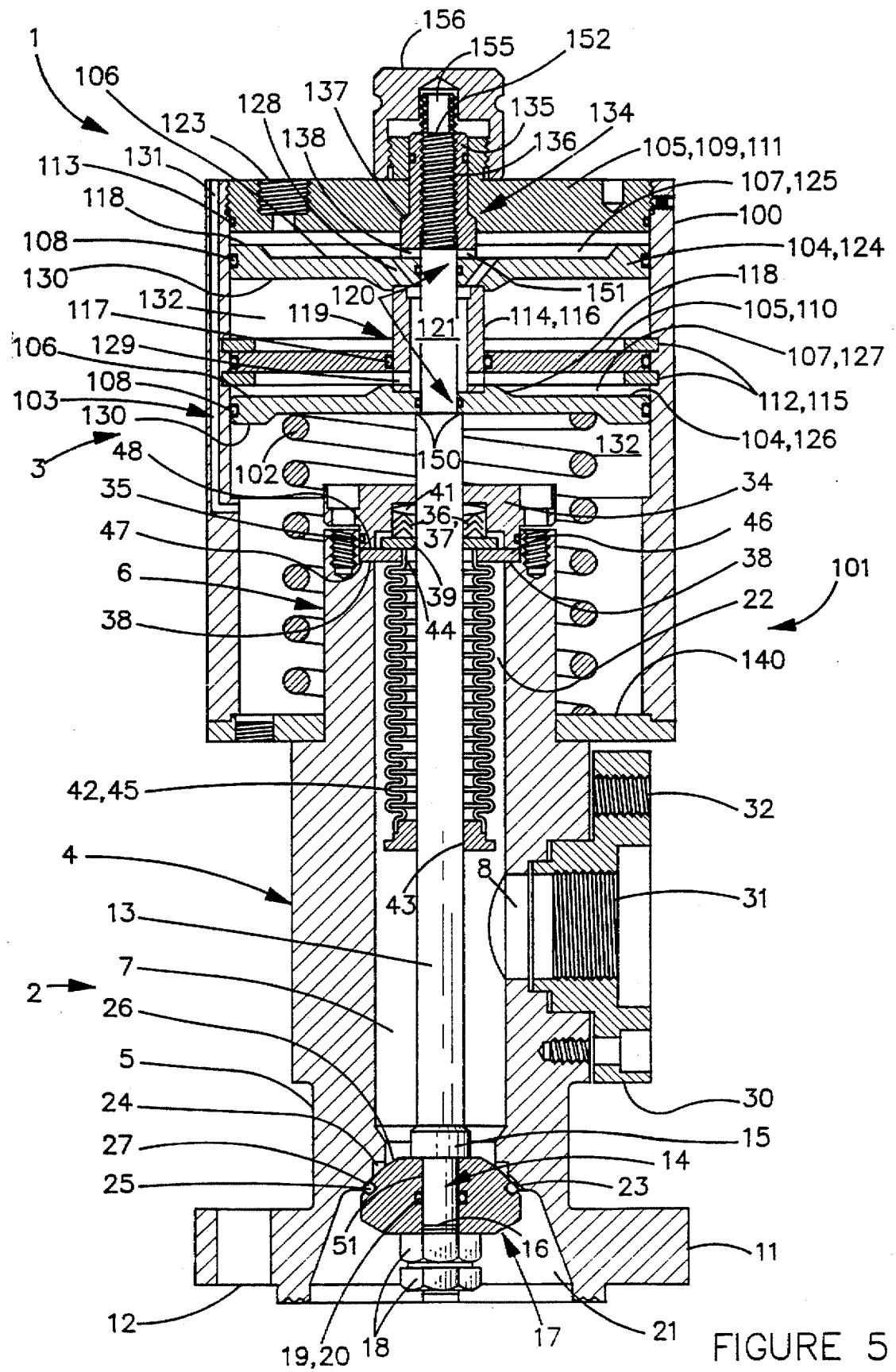
FIG. 5 is a cross-sectional view of an embodiment of the invention.

Shown in FIG. 5 is the valve/actuator combination 1, having a valve 2, and an actuator 3. The valve 2 has a valve body 4, with a tank end 5, and a actuator end 6. A longitudinal bore through the valve body 4 forms a stem chamber 7. The end of the stem chamber 7 at the tank end 5 forms a seat port 21 and the end of the stem chamber 7 at the actuator end 6 forms an actuator port 22. A transverse bore through the valve body 4 located between the actuator port 22 and the seat port 21 forms an outlet port 8 in fluid communication with stem chamber 7. The tank end 5 also has an annular tanker flange 11 with manway cover bolt openings 12 positioned for bolting the valve body 4 to a Chlorine Institute standard manway cover 402.

A cylindrical valve stem 13 is slidably positioned in the stem chamber 7. Valve stem 13 has a plug end 14 having a plug shoulder 15 and threaded nipple section 16. Valve 2 further has a plug 17 attached to the valve stem 13. Plug 17 has a central core slidable on nipple section 16. Plug 17 is secured to shoulder 15 of valve stem 13 by plug nuts 18. Plug 17 has a first plug O-ring 20 in a first annular recess 19 in the central core 51 facing the valve stem 13. The first plug O-ring 20 seals plug 17 to valve stem 13. Plug 17 has a second plug O-ring 27 in second annular recess 25 positioned on plug radiused shoulder 26 for sealing plug 17 against seat port 21.

Figure 8:
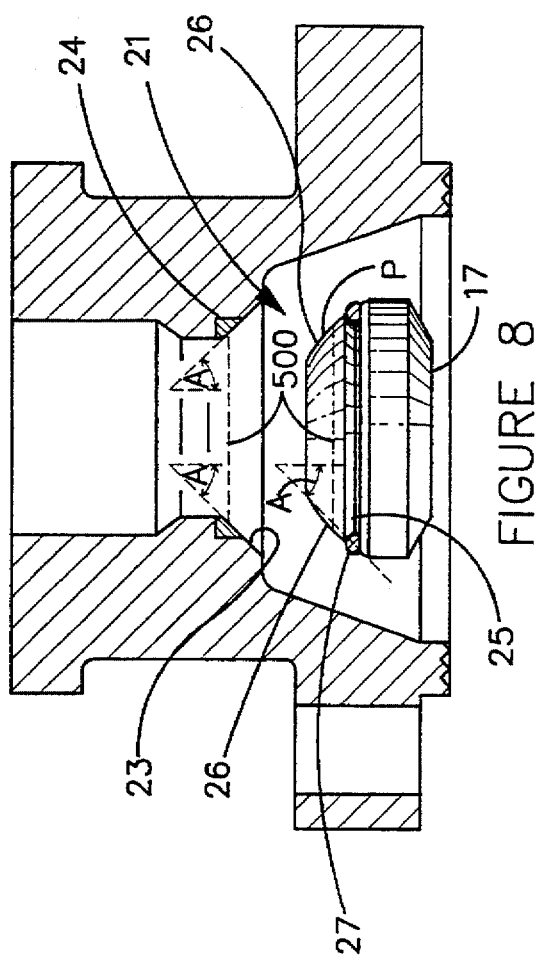
FIG. 8 is an exaggerated cross sectional view of the plug and valve seat of an embodiment of the invention illustrating the sealing area of the valve.

The flared opening of the seat port 21 terminates in a port shoulder 23, more fully shown in FIG. 8. The port shoulder 23 is recessed to receive a valve seat insert 24. The valve seat insert 24 is preferably made of a material, such as Monel K500, or Hastelloy C-276, having a hardness in excess of that of ASTM, AMS 4676. When the valve 2 is closed, port shoulder 23 and plug radiused shoulder 26 are shaped to meet and seal on a circular sealing contact line 500 shown in FIG. 8.

Figure 6:
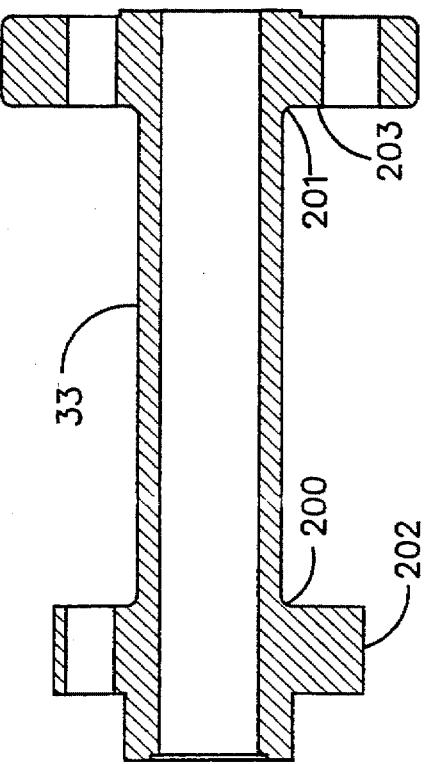
FIG. 6 is a lengthwise cross-sectional view of the outlet port extension of the invention.

Attached to the outlet port 8 is an outlet flange 29. The outlet flange 29 has a threaded bore 31 for receiving a threaded pipe. Outlet flange 29 is easily replaced if the threads of the threaded bore 31 become damaged. Outlet flange 29 may also have a series of threaded openings 32 for attaching an outer port extension 33, as shown in FIG. 6.

Valve stem 13 extends upwardly and exits the valve body 4 through the actuator port 22. Yoke 34 is sealingly attached to the valve body 4 near the actuator port 22, the valve stem 13 extending through yoke 34. Yoke 34 can be attached to the valve body 4 with a variety of sealing means. As shown in FIG. 5, yoke 34 is bolted to the valve body 4. Yoke 34 has a yoke O-ring 35 facing the stem chamber 7. Yoke 34 may also have a packing means 36 for slidably sealing the yoke 34 to the valve stem 13. Packing means 36 may be an O-ring or a series of O-rings. As shown in FIG. 5, packing means 36 is a series of Chevron-style washers 37 constructed of polytetrafluoroethylene ("PTFE"). The Chevron-style washers 37 bear, either directly or indirectly, against a surface on the valve body 4. Chevron washers 37 may bear directly on the valve body 4 by seating on a bearing shoulder 38 in the valve body 2 (relationship not shown), or by seating on a bearing flange 39, where the bearing flange 39 seats on the bearing shoulder 38 (relationship not shown). As shown in FIG. 5, Chevron-style washers 37 bear against bearing flange 39, bearing flange 39 bears against bellows flange 46 which bears against bearing shoulder 38. When placed under a load occasioned by the torquing of yoke 34 attachment bolts, Chevron-style washers 37 deform by flattening and sealing against valve stem 13. The load on the Chevron-style washers 37 may be increased by incorporating a spring means 41, such as a spring clip or a crest washer or Belleville washer, in the packing means 36. A PTFE gasket may be provided between bearing flange 39 and the surface on which bearing flange 39 seats.

Valve 2 may also incorporate a sealing shroud 42. Sealing shroud 42 has a stem end 43 attached to the valve stem 13 and a yoke end 44 connected to the valve body 4. Stem end 43 may be either fixedly or slidably attached to valve stem 13. Yoke end 44 is connected to yoke 34 or stem chamber 7. FIG. 5 shows a sealing shroud 42 in the form of a bellows 45. Stem end 43 of bellows 45 is welded to valve stem 13, while yoke end 44 is welded to bellows flange 46. Bellows flange 46 bears on bearing shoulder 38, separated by a first gasket 47. Bearing flange 39 bears on bellows flange 46, separated by a second gasket 48. Preferably, first and second gaskets are composed of PTFE. Bellows 45 acts like a spring device by generating an upward restoration force when the bellows 45 is stretched, the restoration force opposing the stretching of the bellows 45.

The invention also has an actuator 3. Actuator 3 is a hollow body 100 having a valve end 101. Actuator 3 is joined to the valve body 4 near valve end 101. Actuator 3 and valve body 4 may be integrally joined by casting. Valve end 101 forms a bearing surface 140 for a biasing means, such as helical coil spring 102, positioned in the hollow body 100.

A plurality of piston assemblies 103 are stacked within hollow body 100. Each piston assembly 103 has a piston 104 slidable in piston chambers 132 in hollow body 100, and a partition 105 fixed in the hollow body 100. Pistons 104 have an upper face 106, and a lower face 130. The area between upper face 106 of the piston 104 and partitions 105 form actuation chambers 107. Shown in FIG. 5 are two such piston assemblies 103. Each upper piston face 106 has a shoulder section 118 to prevent actuation chambers 107 from fully closing. Alteratively, shoulder sections 118 could be provided on the partitions 105 to prevent the actuation chambers 7 from fully closing (not shown). First wall O-rings 108 form slidable seals between the pistons 104 and hollow body 100.

As shown in FIG. 5, first partition 109 is threaded into hollow body 100 to fixed first partition position with respect to hollow body 100. First partition 109 thus forms end wall 111 of the actuator 3. End wall 111 and first piston 124 form first actuator chamber 125 therebetween in the hollow body 100. The second partition 110 is fixed to hollow body 100 by snap rings 112, snap rings 112 being held in snap ring recesses 115 in the hollow body 100. Second partition 110 and second piston 126 form second actuator chamber 127 therebetween in the hollow body 100. Second wall O-rings 113 seal partitions 105 against hollow body 100.

Pistons 104 are connected by rigid piston spacer 114. Piston spacer 114 may be a hollow collar 116 as shown, or a piston rod, a shoulder on one of the pistons 104, or any structure fixing the positions of pistons 104 with respect to each other so that pistons 104 move in unison. As shown, hollow collar 116 slidably extends through an aperture 119 in the second partition 110 and is slidably sealed against second partition 110 by collar O-ring 117.

Valve 2 and actuator 3 are operatively connected by joining valve stem 13 to pistons 104 so that valve stem 13 and pistons 104 move in unison. Piston O-rings 122 seal pistons 104 to valve stem 13. Valve stem 13 has a piston shoulder 150 upon which lower face 130 of second piston 126 bears. Thus, when pistons 104 move downwardly, second piston 126 bears downward on piston shoulder 150, mechanically imparting a downward movement to valve stem 13 in unison with pistons 104. Upward movement of the pistons 104 is also mechanically transferred to valve stem 13. Preferably, pistons 104 have center apertures 120 which align with the central axis of the hollow collar 116 to form a rod chamber 121 therebetween through which valve stem 13 extends. End wall 111 has a central opening 134 and a sleeve 135 slidable in the central opening 134. The central opening 134 is aligned with valve stem 13. Sleeve 135 has a threaded bore 136 therethrough and a first lip section 137 for contacting the end wall 111 to restrain the upward movement of the sleeve 135 in the central opening 134. A second lip section 151 of the sleeve bears on upper face 106 of first piston 124. A lip gasket 138 is interposed between the second lip section 151 and the upper face 106 of first piston 124. Valve stem 13 has a threaded termination end 152 threadably inserted into threaded bore 136. Thus, when pistons 104 move upwardly, first piston 124 bears on second lip section 151 of sleeve 135 threadably attached to valve stem 13, thus imparting an upward movement to valve stem 13 in unison with pistons 104.

Actuator 3 also has a path means for introducing pressurized fluid into the actuator chambers 107. Preferably, path means includes a threaded nipple opening 123 in the end wall 111, the threaded nipple opening 123 fluidly communicating with the first actuator chamber 125; a series of fluid piston openings 128 through the first piston 124, the fluid pistons opening 128 fluidly communicating with the first actuator chamber 125 and the rod chamber 121; and a series of fluid collar openings 129 in the hollow collar 116; the fluid collar openings 129 in fluid communication with the rod chamber 121 and the second actuator chamber 127. Alternatively, path means could include a bore in the walls of the hollow body 100 fluidly connecting the first actuator chamber 125 with the second actuator chamber 126 (not shown).

In operation, helical coil spring 102 applies an upward biasing force against second piston 126, which force is transmitted to the operationally connected valve stem 13 to close the valve 2. To open the valve 2, pressurized fluid is introduced into the first actuator chamber 125 through the threaded nipple opening 123. Pressured fluid flows from first actuator chamber 125 into fluid piston opening 128 through first piston 124, into rod chamber 121 in the hollow collar 116, out of fluid collar openings 129 into second actuator chamber 127. The pressurized fluid in actuator chambers 107 exerts a force on piston upper faces 106 opposing the bias force of helical coil spring 102 sufficient to overcome the bias force of helical coil spring 102, the restoration force of the bellows 47, and the frictional forces generated by the various O-rings and packing means 36 moving pistons 104, valve stem 13 and plug 17 downward, thereby opening valve 2.

Actuator 3 may also have a backup mechanical means for operating the valve 2. The backup means shown in FIG. 5 is provided by a protrusion section 155 of termination end 152 of valve stem 13 which extends through the end wall 111. Bearing down on protrusion section 155 with a suitable means mechanically opposes the bias force of helical coil spring 102, moving valve stem 13 downward and thus opening valve 2. To protect the protrusion section 155, an end cap 156 for covering the protrusion section 155 may be threadably attached to the end wall 111.

Also shown in FIG. 5 are vent bores 131. Vent bores 131 allow piston chambers 132 to fluidly communicate with the atmosphere to prevent pressure build up in the piston chambers 132 as the actuator chambers 107 expand. Actuator 3 may also include a bleed valve for bleeding the pistons chambers 132. Finally, an angled nipple may be attached to the threaded nipple opening 123.

Shown in FIG. 6 is a cross section through outlet port extension 33. Outlet port extension has a port end 200 and a distal end 201. Attached to port end 200 is an attachment segment, such as port end flange 202, to attached the outlet port extension 33 to outlet port 29 or to outlet flange 30 inserted in outlet port 29. As shown in FIG. 6, port end flange 202 is equipped with a series of holes therethrough for attachment. Port end flange 200 is sized to fit through the standard sized dome port opening 400 on a tanker railcar dome 401.

Figure 7:
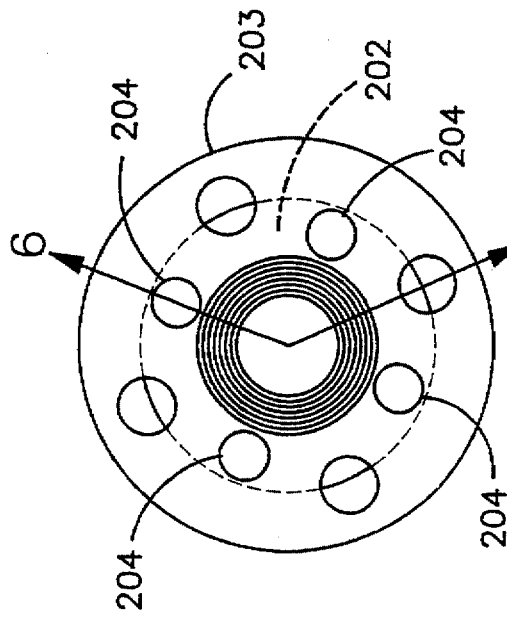
FIG. 7 is an end view from the distal end of the outlet port extension of the invention.

Outlet port extension 33 is of sufficient length to allow distal end 201 to project through the dome port opening 400 when the outlet port extension 33 is attached to outlet port 29 on valve body 4 attached to the manway cover 402 covered with railcar dome 401. Attached to distal end 201 is a flange means, such as distal end flange 203. FIG. 6 shows distal end flange 203 as integral with outlet port extension, but this is not necessary. Distal end flange 203 could have a center threaded bore for threading onto matching male threads on distal end 201 of outlet port extension 33 (not shown). Any flange means attached to distal end 201 must allow the attachment segment on the port end 200 to be attached to outlet port 29 or outer flange 30 through dome port opening 400. One means is for distal end flange 203 to have a series of alignment openings 204 through the distal end flange 203 as is shown in FIG. 7. In this fashion, outlet port extension 23 may be inserted into outlet port 29 through dome port opening 400 and the connection means, or bolts, for attaching port end flange 202 may be attached through the alignment openings 204 in the distal end flange 203.

FIG. 8 shows an exaggerated view of the plug 17, plug radiused shoulder 26, port shoulder 23 and valve seat insert 24. Plug radiused shoulder 26 is an angular surface of angle A, that angular surface having a curvature of radius of curvature P. Seat shoulder is an angular surface of angle A having no curvature. Because of the differences in curvature, when valve 2 is closed, the plug radiused shoulder 26 contacts the port shoulder 23 on a circular sealing contact line 500. Because the contact between plug 17 and seat port 21 is a single line, the plug 17 is self-centering upon closing, thereby reducing the need for critical tolerances in the machining of the two contacting surfaces to create a proper seal. Valve seat insert 24 is positioned on the port shoulder 23 so that circular sealing contact line 500 is contained within valve seat insert 24. Valve seat insert 24 preferably is of a material having a hardness greater than that of ASTM, AMS 4676, such as Stellite 21, manufactured by Haynes Stellite Company. Due to the greater spring strengths that can be use in this invention, the valve 1 can close with greater speed and force than those previously known. Upon closure, valve seat insert 24 will thus act as a knife edge shearing off any deposits that otherwise might built up on circular sealing contact line 500. As shown, plug 17 has a second plug O-ring 27 located in a second plug recess 25. Second plug O-ring 27 is interposed on plug radiused shoulder 26 between the circular sealing contact line 500 and plug nuts 18. Second O-ring 27 provides a second seal between the plug 17 and the port shoulder 23, providing the valve 2 with sealing redundancy.

We claim:

1. In combination with a tanker railcar having a tank, an opening in said tank, a manway attached to said opening, said manway having a port therethrough, said manway having attachment points to attach at least one emergency hood, a valve and actuator in combination attached to said port said valve and actuator comprising:
  (A) a valve having
    (i) a valve body having a tank end and an actuator end, said valve body tank end having a means for connection to said manway;
    (ii) a valve seat near said tank end of said valve body, said valve seat having a first sealing surface;
    (iii) a stem chamber extending through said valve body, said stem chamber having an actuator port, a seat port, and an outlet port, said seat port, said actuator port and said outlet port fluidly communicating with said stem chamber, said seat port positioned on said tank end, said outlet port positioned between said actuator port and said seat port;
    (iv) a valve stem slidably positioned in said stem chamber, said valve stem having a plug end; and
    (v) a plug attached to said plug end of said valve stem, said plug having a second sealing surface adapted to sealingly contact said first sealing surface of said valve seat;
  (B) an actuator having
    (i) a hollow housing having an valve end, said valve end fixedly connected to said valve body;
    (ii) a plurality of piston assemblies, each of said piston assemblies having
      (a) a piston slidable in said housing, each of said pistons having an upper face;
      (b) a partition in said housing sealingly fixed in position relative to said housing, said upper face of said piston and said partition defining an actuator chamber therebetween;
    (iii) piston spacers joining said pistons so that each of said pistons is fixed in position with respect to the others, said pistons further being operatively joined to said valve stem so that said valve stem is fixed in position relative to said pistons;
    (iv) biasing means for generating a biasing force to bias said plug second sealing surface against said valve seat first sealing surface thereby closing said valve; and
    (v) a path means for introducing pressurized fluid into said actuator chambers so that the pressurized fluid exerts a force against said upper face of said pistons in opposition to said biasing force;
  said valve and said actuator further sized to fit within the emergency hood, in order to sealingly isolate a leaking valve and actuator in combination.

2. A combination according to claim 1 wherein said valve body further comprises:
  (vi) a yoke, said valve stem extending slidably through said yoke, said yoke further having a packing means for forming a seal between said yoke and said valve stem, said valve stem, said yoke and said packing means fluidly sealing said actuator port of said stem chamber.

3. A combination according to claim 2 wherein said packing means comprises a series of polytetrafluoroethylene Chevron style washers and a spring means for biasing said Chevron washers.

4. A combination according to claim 1 wherein said value further comprises a sealing shroud positioned in said stem chamber, said valve stem extending through said sealing shroud, said sealing shroud having a yoke end and a stem end, said yoke end being sealing connected to said stem chamber above said outlet port, said stem end being sealingly connected to said valve stem between said yoke end of said shroud and said plug.

5. A combination according to claim 4 wherein said sealing shroud comprises a bellows and wherein said stem end of said bellows is fixedly connected to said valve stem.

6. A combination according to claim 1 wherein said valve further has a outlet flange attached to said outlet port.

7. A valve/actuator in combination according to claim 1, wherein said tanker rail car further having a checkvalve connected to said port of said manway and extending downwardly into the interior of said tanker railcar, and said biasing means and upper faces being sized so that when pressurized fluid is introduced into said actuator chambers, said valve opens operating said checkvalve, whereby allowing access to the interior of said tanker railcar through said valve/actuator combination.

8. A combination according to claim 7 wherein said valve further has a outlet flange attached to said outlet port.

9. A combination according to claim 7 wherein said valve further has a hollow outlet port extension, said outlet port extension having a car end, a distal end and an extension section therebetween, said car end having an attachment segment for attaching to said outlet port, said car end and said attachment segment sized to fit through said dome port opening, said extension section of length sufficient to project said distal end external to an attached dome through said outlet port access opening, said distal end further having a flange means, said flange means adapted to allow the attachment of said attachment segment to said outlet port through said dome port opening.

10. A valve/actuator in combination according to claim 7 wherein said tanker railcar further has a dome attached to said tank and covering said manway and of sufficient size to cover the emergency hoods, said dome having dome port openings therethrough wherein said outlet port of said valve is positioned to align with one of said dome port openings.

* * * * *